United States Patent [19]

Beck et al.

[11] 4,236,595

[45] Dec. 2, 1980

[54] AUXILIARY DRIVE SYSTEM

[75] Inventors: Richard A. Beck, West LaFayette; Glen T. Presley, Angola, both of Ind.

[73] Assignee: Parno Corp., Brookston, Ind.

[21] Appl. No.: 67,396

[22] Filed: Aug. 17, 1979

[51] Int. Cl.³ .................... B60K 25/04; F16H 39/46
[52] U.S. Cl. .................................... 180/243; 60/420; 60/443; 60/448; 60/DIG. 2; 180/77 R; 180/197; 180/247; 180/307
[58] Field of Search ............... 180/197, 242, 243, 307, 180/308, 247, 77 R; 60/420, 425, 426, 427, 437, 438, 448, 465, 698, 711, 443, DIG. 2

[56] References Cited

U.S. PATENT DOCUMENTS

| | | | |
|---|---|---|---|
| 3,053,043 | 9/1962 | Knowler | 180/308 X |
| 3,354,978 | 11/1967 | Budzich | 180/243 |
| 3,481,419 | 12/1969 | Kress et al. | 180/243 |
| 3,736,732 | 6/1973 | Jennings et al. | 180/243 X |
| 4,140,196 | 2/1979 | Brewer | 180/242 |

Primary Examiner—Irwin C. Cohen
Attorney, Agent, or Firm—Edward L. Brown, Jr.

[57] ABSTRACT

An electro-hydraulic auxiliary drive system providing power to the non-driven steerable wheels of an agricultural tractor utilizing hydraulic power in a parallel circuit from a pressure compensated pump which varies torque supplied to the auxiliary system by sensing the relative speed between the front and rear wheels and increases the torque to the auxiliary system when a set percentage of slip is determined between the front and rear wheels. The steerable wheels are driven by hydraulic motors connected in parallel through a flow divider valve and supplied by a variable displacement pressure compensated pump. When the electronic control receives an indication of slip from the main drive wheels it energizes a solenoid causing the pressure compensation level of the variable displacement pump to increase the torque output of the auxiliary drive system, with the percentage of slip being proportional to the increased torque.

11 Claims, 2 Drawing Figures

AUXILIARY DRIVE SYSTEM

BACKGROUND OF THE INVENTION

The present invention relates generally to hydraulic drive systems and more specifically to an add-on auxiliary drive system utilized on the steerable non-driven wheels of an agricultural tractor. Most farm tractors built today are of the conventional two-wheel drive type having two large mechanically driven rear wheels and a pair of smaller steerable front wheels which are not driven. Under most conditions, the conventional main drive wheels provide sufficient tractive effort to propel the tractor and pull the particular tillage implement. However, under certain conditions, additional tractive effort is desirable when the main drive wheels begin to spin. Under such conditions quite often the conventional drive train is not utilizing the full horse power capacity of the tractor and that additional power capacity can be converted into hydraulic energy and drive the front steerable wheels of the tractor. This additional tractive force substantially boosts the drawbar pulling power of the tractor and also improves steering control.

DESCRIPTION OF THE PRIOR ART

Systems of the general type disclosed herein are shown in the following prior art U.S. Pat. Nos.

| | |
|---|---|
| 3,354,978 Budzich | 4,072,009 |
| 3,481,419 Kress | B 432,969 Campbell et al |
| 3,736,732 Jennings, et al | B 526,445 Alderson |

Many of the patents listed above do teach a variety of means for increasing the torque on the auxiliary drive system. The patent to Kress (U.S. Pat. No. 3,481,419) is a system which valves the auxiliary front wheels in parallel or in series, which of course, is one method of increasing torque but it must be done manually. The patent to Campbell (U.S. Pat. No. B 432,969) teaches a series parallel valving arrangement for varying the torque but also teaches the idea of electrically sensing the wheel speed and using that signal to control the auxiliary drive system. The Jennings patent (U.S. Pat. No. 3,736,732) allows for a reduction in torque on the auxiliary system by gearing down the mechanical main transmission. The only way to increase the torque on the auxiliary wheels, is to brake the main drive wheels causing a pressure rise in the auxiliary system which of course is inefficient. The patent to Alderson (U.S. Pat. No. B 526,445) teaches an auxiliary system with the use of variable displacement motors wherein the motors destroke as the available pressure and flow are used by the accessories. This patent teaches no connection between the main and auxiliary wheels. The remaining patents also do not teach any connection between the main drive wheels and the auxiliary system for automatically varying the torque on the auxiliary system.

It is therefore the principal object of the present invention to provide an auxiliary hydraulic drive system for the non-driven steerable wheels which senses the amount of slip on the main drive wheels and accordingly increases the torque on the auxiliary driven wheels as the amount of slip on the main drive wheels increases.

The present invention is an auxiliary drive system for the steerable non-driven front wheels of a tractor and includes an engine-driven variable displacement pressure compensated pump which supplies two fixed displacement motors connected to each non-driven front wheel respectively, in a parallel circuit through a divider valve which divides the flow from the pump to the individual motors regardless of the flow rate, allowing a pre-arranged flow differential between the motors for cornering. The speed of the main drive wheels is sensed along with the speed of the non-driven wheels and a signal is fed to an electronic control means which compares the two wheel speeds so that when a certain percentage of slip on the main drive wheels is acheived, the electronic control means signals the variable displacement pump to increase its pressure level which in turn increases the torque output on the front wheels of the auxiliary system.

The invention will be more readily understood when the following description of certain embodients are described in detail in conjunction with the drawings illustrating the invention in schematic form.

DESCRIPTION OF THE PREFERRED EMBODIMENT

Figure 1:
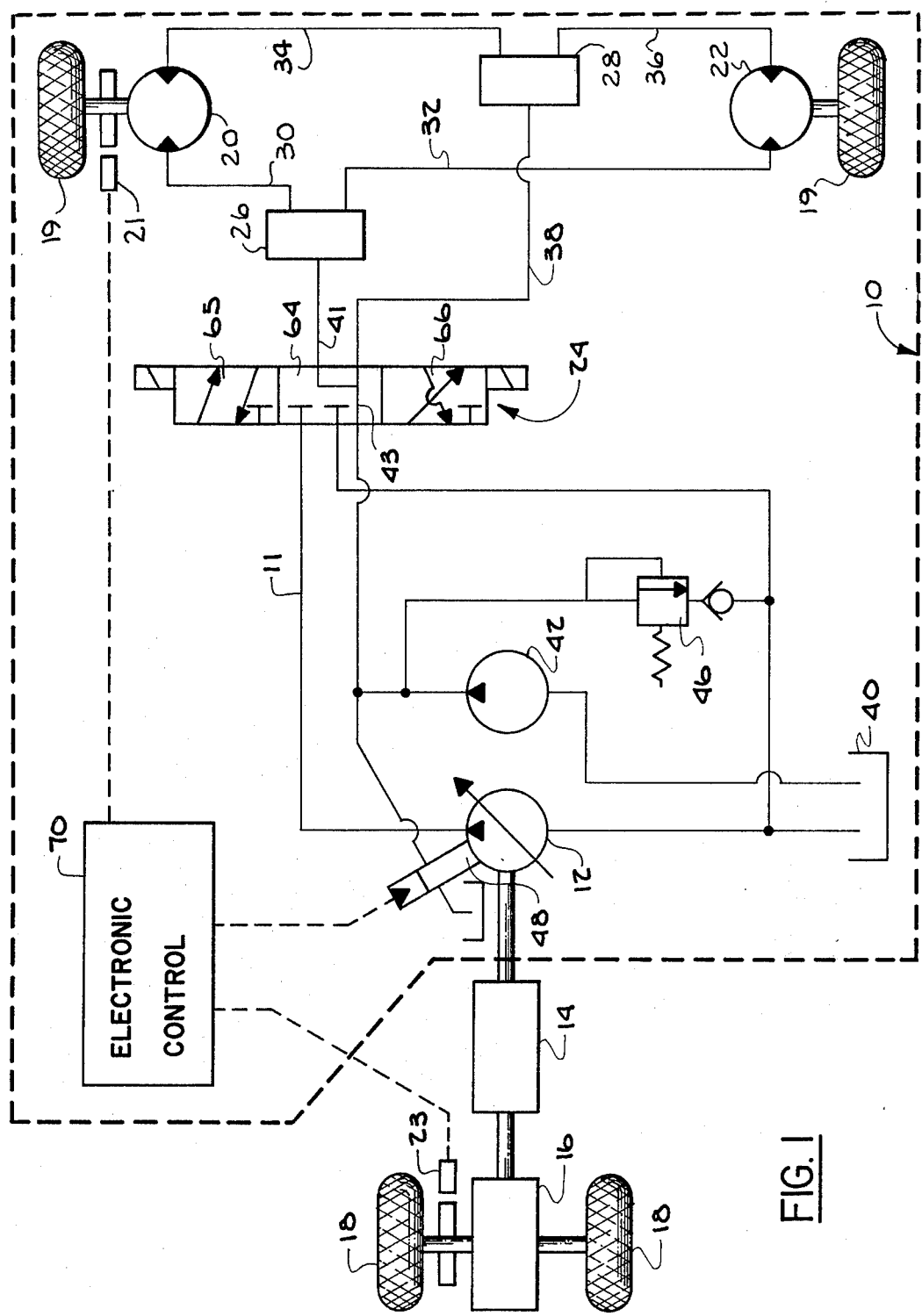
FIG. 1 is a schematic illustration of the auxiliary drive system in conjunction with the main drive system of a tractor.

With reference to FIG. 1 of the drawing, the auxiliary hydraulic drive system of the present invention is generally described by reference numeral 10. The auxiliary system 10 is supplied with hydraulic energy by a pressure compensated variable displacement pump 12, which is of the axial piston type well known in the prior art. Pump 12 is driven by the power source of the tractor 14 which also drives the main drive wheels 18 through a conventional mechanical transmission 16. Pump 12 supplies two fixed displacement reversible wheel motors 20 and 22 through a selector valve 24 in a parallel circuit which branches from a divider valve 26 into individual motor lines 30 and 32 to their respective motors. Motors 20 and 22 drive wheels 19 which are the steerable front wheels of the tractor. Sensor 21 on wheel motor 20 electrically senses the wheel speed of the front wheels while sensor 23 on wheel 18 senses the main drive wheel speed. Motor return lines 34 and 36 are joined in a second divider valve 28 for return to reservoir 40 via line 38. Divider valves 26 and 28 are not shown in detail, but are of the type described in U.S. Pat. No. 4,140,196. Divider valves 26 and 28 equally divide the flow from a single source to the individual motors, regardless of the flow rate, allowing a pre-arranged flow differential between the motors for cornering.

The auxiliary system 10 includes a low pressure charging pump 42 which has a dual function of providing constant low pressure fluid to the spring tension cylinder 44 of FIG. 2, which will later be described in detail, and also charging the auxiliary system 10 in its freewheeling neutral position, as shown in the drawing in FIG. 1. The level of pressure in the charging system is approximately 200 PSI and is maintained by a relief valve 46.

Figure 2:
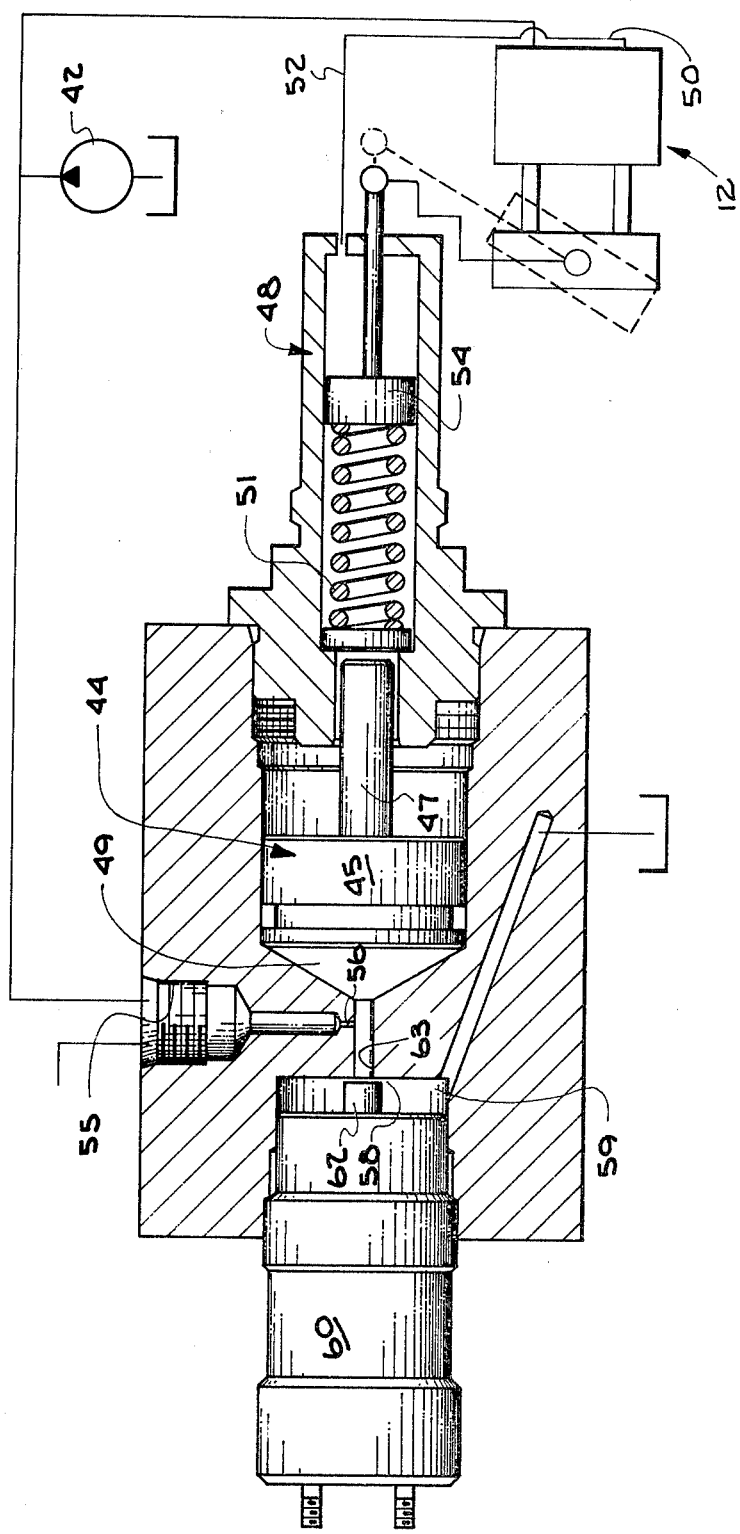
FIG. 2 is a sectional view of the power means for varying the pressure compensating level of the pump servo cylinder with the related elements of the system symbolically shown.

FIG. 2 illustrates in further detail the variable displacement pressure compensated pump 12 including a servo cylinder 48 for controlling the displacement of the pump. The pump discharge line 50 is connected to servo cylinder 48 via sensing line 52. Compression spring 51 biass servo cylinder piston 54 to the right, toward a position of maximum stroke, as shown in dotted line. The load on spring 51 determines the pressure compensating level of pump 12 since the discharge pressure of the pump is sensed on the right side of servo cylinder 48.

Axially aligned to the left of spring 51 is a single acting spring tension cylinder 44, which includes a piston 45 and extension pin 47. Charging pump 42 maintains a constant pressure in passage 55, which flows across a fixed orifice 56 and then across variable orifice 58 into drain cavity 59. The pressure felt in cylinder chamber 49 will vary depending upon the size of variable orifice 58. Variable orifice 58 comprises a solenoid 60 having a movable plunger 62 which partially blocks drain passage 63 when the solenoid is energized. Solenoid 60, also referred to as a lineal force motor, will exert a force on plunger 62 proportional to the voltage received by solenoid 60. With zero voltage passing through solenoid 60, the variable orifice 58 is quite large compared to orifice 56, therefore the pressure level in cylinder chamber 49 is near zero while the pressure level upstream of orifice 56 is 200 PSI. As the voltage signal increases to solenoid 60, the force closing orifice 58 increases causing the pressure level in cylinder chamber 49 to increase. The pressure level in spring tension cylinder 44 is proportional to the voltage in solenoid 60.

OPERATION

When the auxiliary system 10 of the present invention is disengaged or in its freewheeling position, selector valve 24 is in its center position 64, as illustrated in FIG. 1. In this freewheeling position, motors 20 and 22 are discharging in lines 34 and 36, respectively, in a closed loop back to the inlet side of the motors through lines 38, 41, 30 and 32. Any leakage from this closed loop circuit is made up by charging line 43 which connects to the closed loop through the selector valve's neutral position 64.

To engage the auxiliary system 10 for movement in a forward direction, selector valve 24 is shifted to its position 65, which connects pump discharge flow in line 11 directly to inlet line 41, while draining return line 38 to reservoir 40. In a no-slip condition, variable displacement pump 12 will stand by at a set pressure level of 1500 PSI, for example, which is determined by the compressive force of spring 51 in servo cylinder 48 (see FIG. 2). As the main drive wheels 18 of the tractor increase in speed, the front wheels 19 will also increase in speed requiring a higher flow rate from pump 12. This drops the working pressure in the auxiliary system 10 causing the servo cylinder 48 to maintain its pressure compensating level by increasing the stroke on the pump 12 until that pressure level is regained.

FIG. 2 illustrates the spring tension cylinder 44 in its non-slip condition wherein the piston 45 is fully retracted to the left since variable orifice 58 is fully open and the pressure in chamber 49 is essentially zero. As the pulling load on the tractor increases, rear drive wheels 18 begin to move faster than front wheels 19 since only a small amount of torque is being applied to the front wheels while the primary load is being born by the rear main drive wheels 18. As for example, with a rear wheel speed of 96 RPM and front wheel speed of 80 RPM, there is approximately twenty percent (20%) slippage of the main drive wheels; assuming the front wheels are not slipping at all. With sensors 23 and 21 sensing the speed of the rear and front wheels, respectively, the electronic control 70 receives these wheel speeds by electrical signal and compares them so that when the rear wheel slip exceeds ten percent of the overall wheel speed, control 70 energizes solenoid 60 thereby causing the spring tensioning cylinder 44 to increase the load on spring 51. Increasing the load on spring 51 increases the pressure compensating level of pump 12. By increasing the pressure level of pump 12, the torque applied by motors 20 and 22 is increased to take up a larger share of the torque necessary to move the tractor.

As the percentage of slip of the rear wheels with relation to the front wheels increases above ten percent (10%), the amount of torque supplied to the auxiliary wheels also increases. As for example, if the rear wheel speed is 100 RPM and the front wheel speed is only 80 RPM, there is a twenty-five percent (25%) slippage of the rear wheels. In this situation, the electronic control 70 energizes solenoid 60 to a higher voltage level causing the pressure in spring tension cylinder 44 to increase and accordingly increase the load on spring 51, which in turn increases the pressure compensating level of the auxiliary system and likewise the output torque on the front wheels. Electronic control 70 at its maximum voltage output will cause the spring tension cylinder 44 to feel the full 200 PSI standby pressure from line 55 which in turn will cause the pump pressure level to go to approximately 4000 PSI applying maximum torque to the auxiliary front wheels. Likewise, as the percentage of slip decreases, the amount of torque applied to the auxiliary front wheels also decreases proportionally until the percent of slip drops below ten percent (10%), or whatever the minimum level may be.

When selector valve 24 is shifted to its reverse position 66, as seen in FIG. 1, the flow dirction to motors 20 and 22 is reversed with the inlet flow passing through line 38 and then divided by divider valve 28 as it flows into respective motors 20 and 22 and then returning to drain through line 41. Reverse flow through either divider valve 26 or 28 does not attempt to control flow, since the divider valve with the forward flow will dominate and control the system.

In another embodiment, the signal of the electronic control 70 can be manually controlled without the sensors 21 and 23, so that the machine operator can selectively vary the torque output to the front wheels.

Having described the invention with sufficient clarity to enable those familiar with the art to construct and use it, I claim:

1. A hydraulic auxiliary drive system for the steerable non-driven wheels of a vehicle in assistance with the main drive wheels, comprising:
   two hydraulic motors connected in a parallel hydraulic circuit, each motor driving a non-driven wheel;
   speed sensing means on the main drive wheels and the non-driven wheels;
   a variable displacement pressure compensated pump supplying said motors including a control servo cylinder acting against a spring means, the servo controlling the displacement of the pump, a sensing line connecting the pump discharge with the servo cylinder;

a power means contacting the spring means for proportionally adjusting the loading on said spring means in accordance with the level of an electrical signal received by said power means;

an electronic control means connected to the sensing means for receipt of signals indicating the relative speeds of the driven and non-driven wheels so that when a certain percentage of slip is sensed between the driven and non-driven wheels the control means transmits a proportional electrical signal to the power means to increase the loading on the spring means which in turn increases the pressure compensating level and torque output of said motors.

2. An auxiliary drive system of claim 1, wherein the power means comprises a single-acting cylinder including a piston with the piston of said cylinder acting against said spring means to increase or decrease the loading on said spring means.

3. An auxiliary drive system of claim 1, wherein the power means comprises a single-acting cylinder including a piston with the piston of said cylinder acting against said sprig means to increase or decrease the loading on same; a source of constant low pressure fluid supplied to said cylinder and an electrically powered valve means located in a drain passage of said cylinder to be supplied by an electrical signal from the control means to control the pressure in said single acting cylinder.

4. An auxiliary drive system of claim 1, wherein the power means comprises a single-acting cylinder including a piston with the piston of said cylinder acting against said spring means to increase or decrease the loading on same; a source of constant low pressure fluid supplied to said cylinder and a lineal force motor blocking a drain passage from said cylinder when in an energized state.

5. An auxiliary drive system of claim 4 wherein the lineal force motor is a solenoid having a plunger axially aligned with the drain passage with the solenoid force opposing the pressure in the drain passage.

6. An auxiliary drive system of claim 1, wherein the electronic control means transmits an initial signal to the power means when the speed of the main drive wheels exceeds the speed of the non-driven wheels by at least ten percent (10%) and a proportionally higher voltage signal as the percentage of slip increases.

7. An auxiliary drive system of claim 1, wherein the power means comprises a single-acting cylinder including a piston with the piston of said cylinder acting against said spring means to increase or decrease the loading on same; a source of constant low pressure fluid supplied to said cylinder and an electrically powered valve means located in a drain passage of said cylinder to be supplied by an electrical signal from the control means to control the pressure in said single acting cylinder, and including a selector valve between the pump and motors having a neutral position blocking flow from the pump while opening motor return flow to motor inlet flow in a closed loop with said source of low pressure fluid connected to the closed loop.

8. An auxiliary drive system of claim 1, including a selector valve between the pump and motors having a neutral position blocking flow from the pump while opening motor return flow to motor inlet flow in a closed loop and a low pressure charging source connected to said closed loop.

9. An auxiliary drive of claim 1, including flow divider means positioned between said pump and motors at the juncture of the parallel circuit dividing the flow equally to each motor.

10. An auxiliary drive system of claim 1, wherein the power means comprises a single-acting cylinder including a piston with the piston of said cylinder acting against said spring means to increase or decrease the loading on same; a source of constant low pressure fluid supplied ot said cylinderand an electrically powered valve means located in a drain passage of said cylinder to be supplied by an electrical signal from the control means to control the pressure in said single-acting cylinder, and including flow divider means positioned between said pump and motors at the juncture of the parallel circuit dividing the flow equally to each motor.

11. A hydraulic auxiliary drive system for the steerable non-driven wheels of a vehicle in assistance with the main drive wheels, comprising:

two hydraulic motors connected in a parallel hydraulic circuit, each motor driving a non-driven wheel;

a variable displacement pressure compensated pump supplying said motors including a control servo cylinder acting against a spring means, the servo controlling the displacement of the pump, a sensing line connecting the pump discharge with the servo cylinder;

a single-acting cylinder including a piston with the piston acting against said spring means to increase or decrease the loading on said sprig means;

a source of low pressure fluid supplied to said cylinder and, an electrically-powered valve means located in a drain passage from said cylinder which controls the pressure level in said cylinder by varying the drain flow;

an electronic control means manually operated and remotely positioned connected to the electrical valve means which transmits a varying electrical signal to said valve means to increase or decrease the loading on the spring means which in turn increases the pressure compensating level and torque output of said motors.

* * * * *